United States Patent [19]

Nosek

[11] Patent Number: 4,972,600
[45] Date of Patent: Nov. 27, 1990

[54] TAPE MEASURE

[75] Inventor: Frank J. Nosek, Naperville, Ill.

[73] Assignee: Keson Industries, Inc., Naperville, Ill.

[21] Appl. No.: 927,679

[22] Filed: Nov. 6, 1986

[51] Int. Cl.$^5$ ............................................. G01B 3/10
[52] U.S. Cl. ........................................ 33/761; 33/769
[58] Field of Search .................... 33/138, 761, 769; 242/84.8

[56] References Cited

U.S. PATENT DOCUMENTS

| | | | |
|---|---|---|---|
| 467,280 | 1/1892 | Lane | 242/84.8 |
| 655,052 | 7/1900 | Brunello | 242/84.8 |
| 1,148,306 | 7/1915 | Fritz | 33/138 |
| 2,914,269 | 11/1959 | Freeman | 33/138 |

FOREIGN PATENT DOCUMENTS

| | | | |
|---|---|---|---|
| 53527 | 5/1912 | Austria | 33/138 |
| 623542 | 7/1961 | Canada | 33/138 |
| 224310 | 2/1910 | Fed. Rep. of Germany | 242/84.8 |
| 1271129 | 7/1961 | France | 242/84.8 |

Primary Examiner—William A. Cuchlinski, Jr.
Attorney, Agent, or Firm—Wood, Phillips, Mason, Recktenwald & VanSanten

[57] ABSTRACT

A tape measure having sidewalls spaced apart a distance slightly greater than the width of the tape to define a small clearance at opposite edges of the tape with the sidewalls. The sidewalls define midway therebetween a center plane. A peripheral portion of the sidewalls adjacent the peripheral wall of the housing defines guide means adjacent the tape-passing opening for causing the centerline of the tape, as it is passed through the opening, to be accurately at the center plane, thereby effectively minimizing edge wear of the tape in the use of the tape measure.

14 Claims, 1 Drawing Sheet

TAPE MEASURE

BACKGROUND OF THE INVENTION

1. Field of the Invention

This invention relates to measuring tapes and in particular to measuring tapes retractably wound on spools rotatably mounted in housings.

2. Description of the Background Art

In one form of measuring tape, the tape is wound on a spool within a relatively flat cylindrical housing. The distal end of the tape extends outwardly through an opening in a peripheral wall of the housing, permitting the tape to be withdrawn from the spool for use in effecting measurements related to scale markings on the tape.

A problem has arisen in such measuring tapes of the prior art in that the tape often becomes improperly wound on the spool when rewound into the housing following a measurement operation. More specifically, the tape may have random displacement parallel to the axis of the spool as it is being rewound thereonto. Such uneven rewinding of the tape causes undesirable angular extension thereof through the housing opening as the tape is withdrawn, resulting in an uneven movement of the tape from the housing, and a tendency to undesirably wear the edges of the tape as a result of forceful engagement thereof with the edges of the opening.

The opposite edges of the opening, in the direction parallel to the axis of the spool, may be spaced apart a distance slightly greater than the width of the tape so that there is a substantial tendency for such wear of the tape edges as a result of such randomly displaced winding of the tape on the spool.

While the housing opening is effectively centered on the center plane of the housing between the top and bottom walls thereof, such erratic winding of the tape on the spool is a common vexatious problem in such measuring tapes and has not been satisfactorily solved heretofore, notwithstanding the longfelt need for elimination of such undesirable tape wear.

SUMMARY OF THE INVENTION

The present invention comprehends an improved tape measure structure having means for effectively assuming the rewinding of the measuring tape in accurate centered relationship to the housing end walls, thereby effectively eliminating the vexatious problem of undesirable wear of the tape edges by the engagement thereof with the edges of the housing opening as the tape is being withdrawn from and rewound onto the spool within the housing.

More specifically, the invention comprehends an improved measuring tape structure having means for accurately maintaining the tape centered on the center plane between the end walls of the cylindrical housing in accurate alignment with the housing opening through which the tape is withdrawn and rewound.

By maintaining the tape as it is wound onto the spool in accurate centered relationship to the housing opening, wear on the edges of the tape is effectively minimized and a smooth withdrawing and rewinding operation is permitted.

In the illustrated embodiment, the housing is provided with inwardly displaced portions of the end walls thereof serving as guide means for the tape as it is being rewound under the spool and as it is being withdrawn from the spool in the use of the tape measuring device.

The invention comprehends that the peripheral portion of the housing have a width parallel to the axis of the spool greater than width of the housing radially inwardly thereof, whereby the radially inward portion of the housing may serve as the guide means in effecting the desired controlled winding and unwinding operations.

The improved tape measure structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
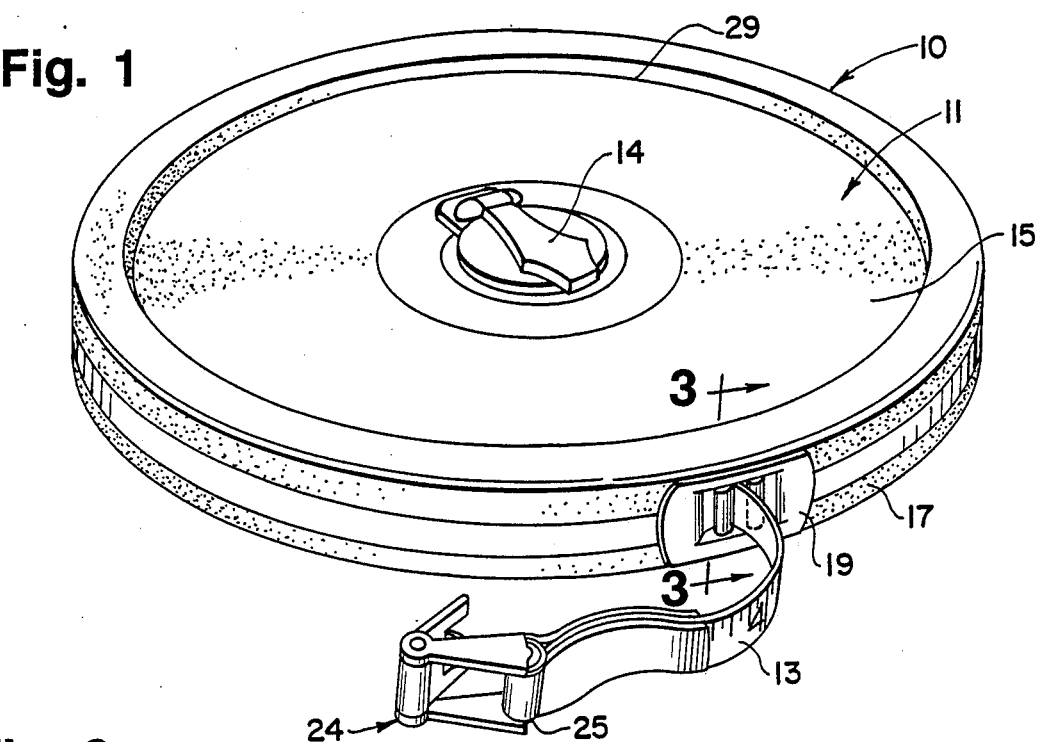
FIG. 1 is a perspective view of a tape measure embodying the invention.
Figure 2:
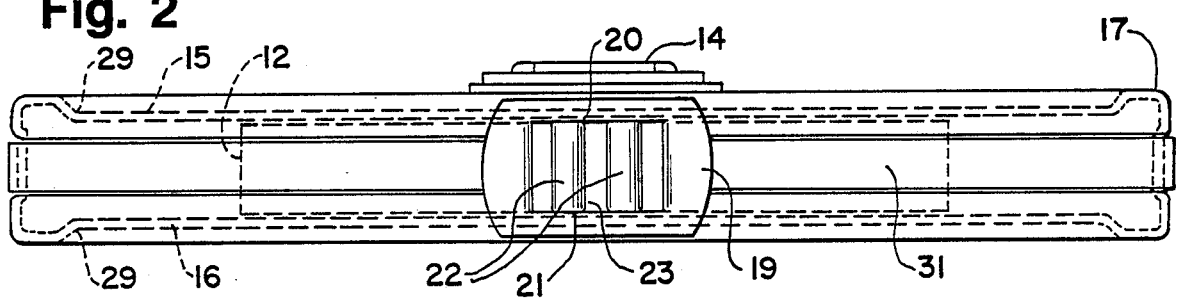
FIG. 2 is a side elevation thereof.

In the illustrated embodiment of the invention as disclosed in the drawing, a tape measure generally designated 10 is shown to include a housing 11 rotatably enclosing a spool 12 on which a flexible measuring tape 13 is selectively wound. The spool is manually rotatable by means of a conventional retractable handle 14 accessible at one end wall 15 of the housing.

In the illustrated embodiment, housing 11 comprises a flat cylindrical housing including an opposite second end wall 16 and a peripheral annular wall 17.

A tape-passing opening 18 is provided in wall 17 and is effectively defined by a frame element 19 secured to the wall 17 and defining an upper edge portion 20 and a lower edge portion 21. A pair of rollers 22 are rotatably journaled at their opposite ends in the edge portions 20 and 21 so as to guide the tape 13 through the slot 23 therebetween.

The distal end of the tape 13 may be provided with a grasping handle 24 having a connecting portion 25 to which the end of the tape is connected and which has a transverse dimension greater than the width of the slot 23, thereby limiting the inward movement of the tape into the housing during a rewinding operation.

Figure 3:
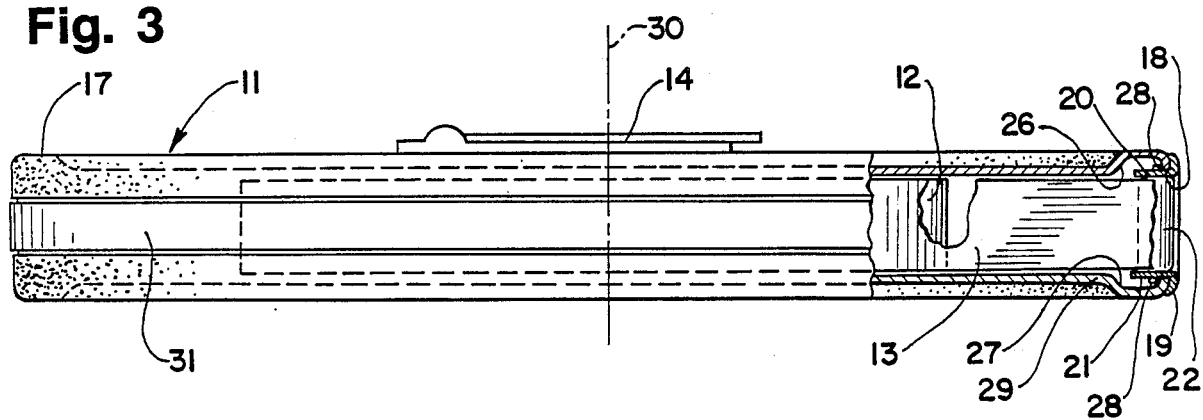
FIG. 3 is a side elevation taken at substantially right angles to the elevation of FIG. 2, and with a portion thereof shown in diametric section.

As best seen in FIG. 3, peripheral wall 17 is generally C-shaped in diametric section so as to define a pair of opposed, inwardly facing annular channels 26 and 27 into which the opposite ends of the axle 28 for the rollers 22 extend.

In the illustrated embodiment, housing end walls 15 and 16 are slightly dished, having the minimum spacing therebetween at the periphery 29 integrally joined to the end wall 17. In the illustrated embodiment, the end walls taper outwardly at an angle of approximately 1° toward the axis 30 of the housing and spool 12.

In the illustrated embodiment, the tape has a width of approximately 12 mm. and the spacing between the end walls at periphery 29 thereof is approximately 15 mm, whereby the clearance between the opposite edges of the tape and the end wall periphery is approximately 1.5 mm. The spacing between the frame edge walls 20 and 21 is approximately 13 mm. at the slit 23. In one illustrative embodiment of the tape measure 10, the outer diameter of the tape measure was 166 mm and the height of the peripheral wall 17 was 20 mm. The housing was formed of 20-gauge thick metal and a securing strap 31 provided for encircling the peripheral wall portion of the walls 15 and 16. The diameter of the peripheral portion 29 of the end walls was approximately 150 mm.

It has been found that by minimizing the spacing between the end walls of the housing, to a dimension only slightly greater than the width of the tape immediately radially inwardly of the guide rollers, an improved uniform winding and unwinding of the tape relative to spool 12 is effected, providing minimized wear on the edges of the tape and smooth withdrawal and rewinding operation of the tape measure in use. The provision of the slight outward taper of the end walls 15 and 16 facilitates the winding and unwinding of the tape relative to the spool 12 for further improved facilitated use of the tape measure.

The foregoing disclosure of specific embodiments is illustrative of the broad inventive concepts comprehended by the invention.

I claim:

1. In a tape measure having a spool defining an axis, and a flexible tape removably wound on said spool and defining a distal free end, the improvement comprising:
    a case housing the spool wound edge, said case defining a tape storage space and having a pair of sidewalls spaced apart a distance slightly greater than the width of the tape to define at opposite edges of the tape a small clearance with the sidewalls, said sidewalls defining midway therebetween a center plane, and an annular peripheral wall substantially closing said storage space, said peripheral wall having a tape-passing opening through which said tape extends to dispose said distal free end thereof outwardly of said peripheral wall, said opening being defined by opposite edges of said peripheral wall spaced apart a distance less than the spacing between said case sidewalls and approximately 1 mm. greater than the width of the tape; and
    a peripheral portion of the sidewalls adjacent said peripheral wall defining guide means adjacent said opening for causing the centerline of the tape as it is passed through said opening to be accurately at said center plane, said guide means being spaced apart a distance slightly greater than the spacing between said opposite edges of said peripheral wall defining said opening.

2. The tape measure structure of claim 1 wherein a frame element is mounted to said peripheral wall and frames opening.

3. The tape measure structure of claim 1 wherein a frame element is mounted to said peripheral wall and frames said opening, said frame element defining side portions respectively adjacent said opposite edges of the tape and spaced apart a distance less than the spacing between case sidewalls and greater than the width of the tape.

4. The tape measure structure of claim 1 wherein a frame element is mounted to said peripheral wall and frames said opening, said frame element defining side portions respectively adjacent said opposite edges of the tape and spaced apart a distance less than the spacing between case sidewalls and approximately 1 mm. greater than the width of the tape.

5. The tape measure structure of claim 1 wherein the spacing between said sidewalls increases radially inwardly from adjacent said peripheral wall.

6. The tape measure structure of claim 1 wherein the spacing between said sidewalls increases radially inwardly from adjacent said peripheral wall at an angle of approximately 1° to said center plane.

7. In a tape measure having a spool defining an axis and a flexible tape removably wound on said spool and defining a distal free end, the improvement comprising:
    a case housing the spool wound tape, said case defining a tape storage space and having a pair of sidewalls spaced apart a distance slightly greater than the width of the tape to define at opposite edges of the tape a small clearance with the sidewalls, said sidewalls defining midway therebetween a center plane, and an annular peripheral wall substantially closing said storage space, said peripheral wall having a tape-passing opening through which said tape extends to dispose said distal free end thereof outwardly of said peripheral wall, said opening being defined by opposite edges of said peripheral wall spaced apart a distance less than the spacing between said case sidewalls and approximately 1 mm. greater than the width of the tape;
    a peripheral portion of the sidewalls adjacent said peripheral wall defining guide means adjacent said opening for causing the centerline of the tape as it is passed through said opening to be accurately at said center plane, said guide means being spaced apart a distance slightly greater than the spacing between said opposite edges of said peripheral wall defining said opening; and
    roller means in said opening for positioning the portion of the flatwise extent of the tape passing through said opening accurately parallel to said axis of the spool.

8. The tape measure structure of claim 7 wherein a frame element is mounted to said peripheral wall and frames said opening, said frame element defining side portions respectively adjacent said opposite edges of the tape and spaced apart a distance less than the spacing between said case sidewalls and greater than the width of the tape, said roller means being rotatably journaled in frame side portions.

9. The tape measure structure of claim 7 wherein a frame element is mounted to said peripheral wall and frames said opening, said frame defining circumferentially opposite end portions, said roller means being rotatably journaled in frame side portions.

10. In a tape measure having a spool defining an axis, and a flexible tape removably wound on said spool and defining a distal free end, the improvement comprising:
    a case housing the spool wound tape, said case defining a tape storage space and having a pair of sidewalls spaced apart a distance slightly greater than the width of the tape to define at opposite edges of the tape a small clearance with the sidewalls, said sidewalls defining midway therebetween a center plane, and an annular peripheral wall substantially closing said storage space, said peripheral wall having a tape-passing opening through which said tape extends to dispose said distal free end thereof outwardly of said peripheral wall, said opening being defined by opposite edges of said peripheral wall spaced apart a distance less than the spacing between said case sidewalls and approximately 1 mm. greater than the width of the tape, said peripheral wall further defining radially inturned annular portions spaced apart a distance greater than the spacing between said sidewalls, said annular portions of the peripheral wall being respectively integrally joined to a radially outer portion of the sidewalls; and a peripheral portion of the sidewalls adjacent said peripheral wall defining guide means adjacent said opening for causing the centerline of the tape as it is passed through said opening to be accurately at said center plane, said guide means being spaced apart a distance slightly greater than the spacing between said opposite edges of said peripheral wall defining said opening.

11. The tape measure structure of claim 10 wherein said inturned portions of the peripheral wall define opposed confronting annular channels.

12. The tape measure structure of claim 10 wherein said inturned portions of the peripheral wall define opposed confronting annular channels, a frame element is mounted to said peripheral wall and frames said opening, said frame element defining side portions respectively adjacent said opposite edges of the tape and spaced apart a distance less than the spacing between said case sidewalls and greater than the width of the tape, roller means in said opening for positioning the portion of the flatwise extent of the tape passing through said opening accurately parallel to said axis of the spool, said roller means including axles projecting into said channels.

13. The tape measure structure of claim 10 wherein said inturned portions of the peripheral wall define opposed confronting annular channels, said guide means comprises a frame element mounted to said peripheral wall and framing said opening, said frame element defining said portions respectively adjacent said opposite edges of the tape and spaced apart a distance less than the spacing between said case sidewalls and greater than the width of the tape, roller means in said opening for positioning the portion of the flatwise extent of the tape passing through said opening accurately parallel to said axis of the spool, said clearance with said housing sidewalls at opposite edges of the tape being approximately 1.5 mm at said peripheral portion defining said guide means.

14. The tape measure structure of claim 10 wherein said inturned portions of the peripheral wall define opposed confronting annular channels, said guide means comprises a frame element mounted to said peripheral wall and framing said opening, said frame element defining side portions respectively adjacent said opposite edges of the tape and spaced apart a distance less than the spacing between said case sidewalls and greater than the width of the tape, roller means in said opening for positioning the portion of the flatwise extent of the tape passing through said opening accurately parallel to said axis of the spool, said clearance with said housing sidewalls at opposite edges of the tape being approximately 1.5 mm. at said peripheral portion defining said guide means and said spacing between said side portions of the frame element being approximately 1 mm. greater than the width of the tape between said side edges thereof.

* * * * *